(12) United States Patent
Jepson et al.

(10) Patent No.: US 7,792,065 B2
(45) Date of Patent: Sep. 7, 2010

(54) SECURELY ESTABLISHING SESSIONS OVER SECURE PATHS

(75) Inventors: Raymond Jepson, Chandler's Ford (GB); Aaron Martin Wetten, Woodhousehill (GB); James Mark Williams, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 11/534,290

(22) Filed: Sep. 22, 2006

(65) Prior Publication Data

US 2007/0071002 A1 Mar. 29, 2007

(30) Foreign Application Priority Data

Sep. 24, 2005 (GB) ................................. 0519524

(51) Int. Cl.
*H04L 12/26* (2006.01)
(52) U.S. Cl. ..................... 370/261; 370/389; 370/401; 709/227
(58) Field of Classification Search ............... 370/261, 370/389, 400, 401, 392, 466; 709/227; 713/168, 713/150
See application file for complete search history.

(56) References Cited

U.S. PATENT DOCUMENTS

| | | | |
|---|---|---|---|
| 6,680,943 | B1 | 1/2004 | Gibson et al. |
| 7,136,387 | B2 * | 11/2006 | Gallant et al. .......... 370/395.52 |
| 2003/0005280 | A1 | 1/2003 | Bobde et al. |
| 2003/0227871 | A1 | 12/2003 | Hsu et al. |
| 2004/0008632 | A1 | 1/2004 | Hsu et al. |
| 2004/0215787 | A1 | 10/2004 | Gibson et al. |
| 2006/0010321 | A1 * | 1/2006 | Nakamura et al. .......... 713/168 |
| 2007/0019622 | A1 * | 1/2007 | Alt et al. ............... 370/352 |

FOREIGN PATENT DOCUMENTS

CN 1444386 12/2001

(Continued)

OTHER PUBLICATIONS

Rosenberg et al. "RFC 3261, SIP:Session Initiation Protocol", Jun. 2002, pp. 1. http://www.faqs.org/ftp/rfc/pdf/rfc3261.txt.pdf.*

(Continued)

*Primary Examiner*—Jayanti K Patel
*Assistant Examiner*—Jung Park
(74) *Attorney, Agent, or Firm*—DeLizio Gilliam, PLLC (57) ABSTRACT

Embodiments include a method directed to a first proxy detecting that a secure data connection between a first and second client should be created on a secure data connection setup path. A first secure connection can be established with the first client. If a second proxy can reach the second client and the second proxy supports secure data connection setup paths, a second secure connection can be established with the second proxy causing the second proxy to establish a third secure connection with the second client. A session key indicating the secure data connection setup path can be received from the second client via the second proxy and forwarded to the first client. A request and session key can be received from the first client to initiate the secure data connection. The request is forwarded to the second client via the first and second proxies based on the session key.

9 Claims, 5 Drawing Sheets

FOREIGN PATENT DOCUMENTS

CN    1510880    7/2004

OTHER PUBLICATIONS

"Security Mechanism Agreement for Session Initiation Protocol (SIP)," http://www.ietf.org.rfc/rfc3329.txt.

Yumin, Wang et al., "Chinese Patent Application Publication No. 1444386 Abstract (English Translation)", (Date obtained from the internet: Oct. 21, 2009) Dec. 31, 2001, 1 page.

Zhiqiang, Liu et al., "Chinese Patent Application Publication No. 1510880 Abstract (English Translation)", (Date obtained from the Internet: Oct. 21, 2009) Jul. 7, 2004, 1 page.

* cited by examiner

SECURELY ESTABLISHING SESSIONS OVER SECURE PATHS

FIELD OF THE INVENTION

This invention relates to a method and apparatus for verifying encryption of SIP signalling.

BACKGROUND OF THE INVENTION

SIP (session initiation protocol) is an internet protocol that supports creation, modification and termination of sessions with one or more participants. SIP is used for voice and video calls, either for point-to-point or multiparty sessions. It is independent of the media transport which for example, typically uses RTP (real-time transport protocol) over UDP (user datagram protocol). SIP is also used for Instant Messaging and presence detection. SIP allows multiple end-points to establish media sessions with each other. It supports locating the end-points, establishing the session and then, after the media session has been completed, terminating the session. SIP has gained widespread acceptance and deployment among wireline service providers introducing new services such as VoIP (voice over internet protocol), within the enterprise for use in Instant Messaging and collaboration applications and among mobile carriers providing push-to-talk services. Industry acceptance of SIP as the protocol of choice for converged communications over IP networks is wide ranging.

Figure 1:
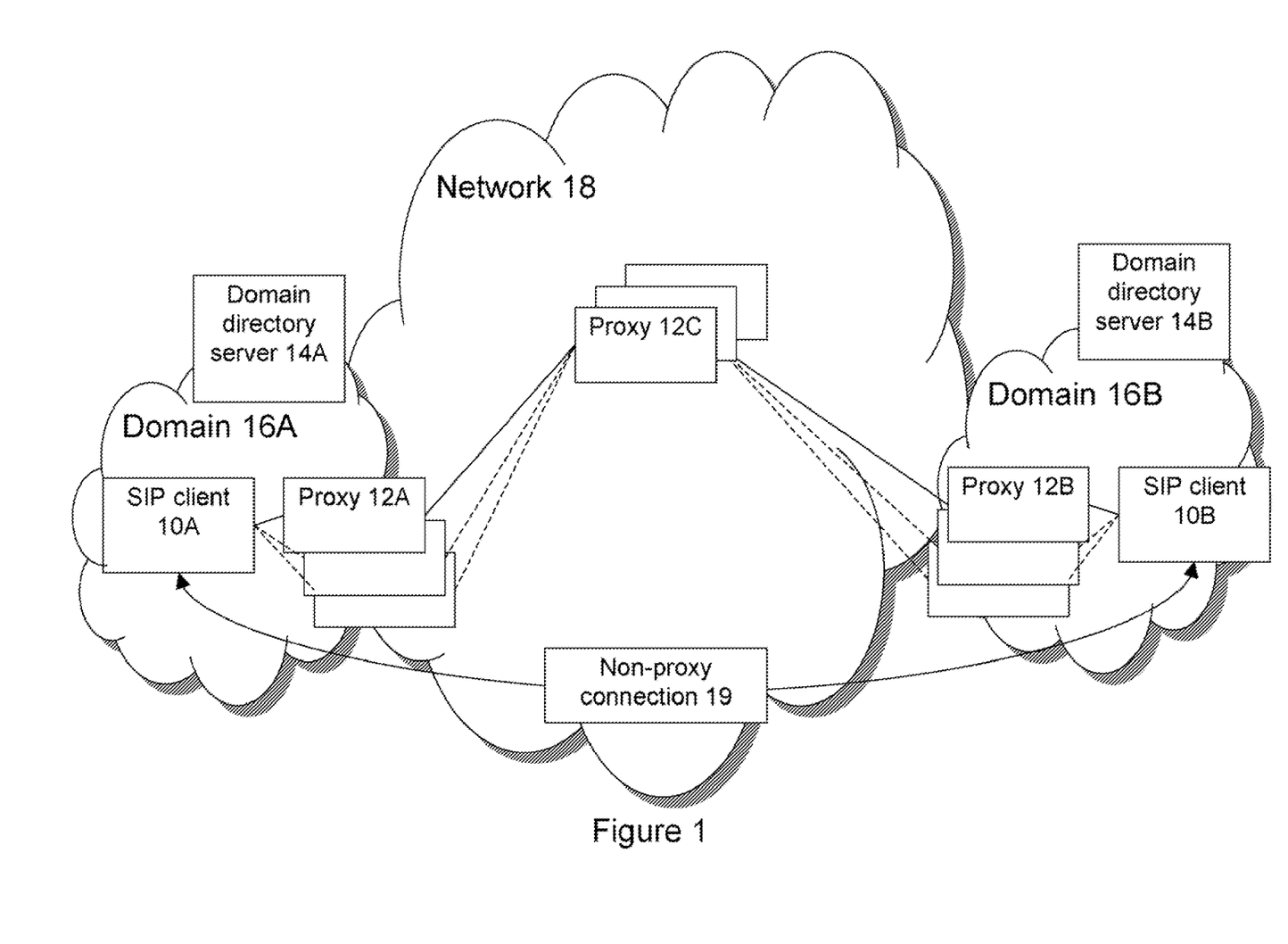
FIG. 1 is a schematic of a typical SIP client, proxy and network configuration.

As shown in FIG. 1, a SIP infrastructure consists of clients 10A and 10B, SIP proxies 12A-12C, and domain directory servers 14A and 14B deployed across domain networks 16A and 16B and network 18 (e.g. the internet). A client is a SIP endpoint that controls session setup and media transfer. A client is identified by a SIP URI (uniform resource identifier), which is a unique HTTP-like (hypertext transport protocol) URI of the form sip:client@domain. All user agents can REGISTER with a SIP directory server (which can be co-located with one of the SIP proxies 12) with their IP address. The mapping of a URI to the IP address of a device registered by the user is done using intermediate SIP proxies and directory servers as part of the session setup process. Details of the SIP protocol can be found in J. Rosenberg et al. SIP: Session Initiation Protocol. RFC 3261. IETF, June 2002.

SIP defines a set of control signals, such as OPTION, OK, INVITE, RINGING, ACK, BYE, etc. to set up a data session between clients. These signals are routed through SIP proxies that are deployed in the network. DNS SRV (Domain name system for services) records in the domain directory servers are used in finding the IP address of a name for a particular domain but this process many use several and often more than one SIP proxy.

All requests from an originating client such as an INVITE are routed by the proxy to an appropriate destination client based on the destination SIP URI included in the INVITE signal. Proxies may query directory servers to determine the current bindings of the SIP URI. Signals are exchanged between clients, proxies and directory servers to locate the appropriate endpoints for media exchange. For reasons of scalability, multiple proxies are used to distribute the signalling load. A normal session is setup between two clients through SIP signalling comprising of an INVITE, an OK response and an ACK to the response. The call setup is followed by media exchange using RTP (real time transport protocol). The session is torn down through an exchange of BYE and OK messages.

SIP distinguishes between the process of session establishment and the actual session. A basic tenet of SIP is the separation of signalling (control) from media (RTP stream) messages. Control signals are usually routed through the proxies while the media path is end-to-end. The signals like INVITE contain user parameters using Session Description Protocol (SDP) in the message body (Handley, M. and V. Jacobson, SDP: Session Description Protocol, RFC 2327, IETF April 1998). SDP provides information about the session such as parameters for media type, transport protocol, IP addresses and port numbers of endpoints. The IP address and port numbers exchanged through SDP is used for the actual data transmission (media path) for the session. Any of these parameters can be changed during an ongoing session through a RE-INVITE message, which is identical to the INVITE signal except that it can occur within an existing session. In addition, a client can transfer an existing session by using a REFER signal. This signal instructs the other endpoint of an existing session to initiate an INVITE/OK/ACK exchange with a third client and terminate the existing session (with the sender of the REFER signal).

By default, SIP signals are transmitted with UTF-8 plain text encoding even though they may contain confidential information. However, to maintain privacy the two IP components of a SIP call, the signals and the data stream, can be encrypted. The calling client may request encryption of the signalling with the first proxy but there is no mechanism for ensuring that subsequent SIP servers encrypt the signal. When the signalling is unencrypted, and IP router that intercepts the signalling between proxies could identify call information such as the identities and internet protocol address of both parties. The calling client would be unaware that the signals were transmitted in plain text on the network. The data stream needs only to be encrypted and decrypted at the end points of the call.

An alternative solution is to have partial encryption of the signalling where only SIP headers essential to intermediate proxies are transmitted in plain text. This is typically implemented using S/MIME (Secure Multipurpose Internet Mail Extension—a format and protocol for adding a signature and/or encryption services to internet messages). This alternative method has two drawbacks. First, since only partial encryption occurs, the level of confidentiality is lower than when using full encryption. Second, as has been noted in RFC 3261, there may be rare network intermediaries (not typical proxy servers) that rely on viewing or modifying the bodies of SIP messages (especially SDP). Use of Secure MIME may prevent these sorts of intermediaries from functioning.

Lastly it should be noted that by using a SIPS URI the user is not guaranteed end-to-end encrypted transport. The user is only guaranteed encrypted transport "from the caller to the domain of the callee" (RFC 3261 Section 4.2)

It is known for a first party to send an invitation to a second party to open a communication channel in the network. The communication channel may be secure once the protocol has been agreed but the initial invitation, which contains sensitive information such as the id of the first and second party, is not "Security mechanism agreement for SIP" is described in RFC3329. The purpose of RFC3329 is to define what encryption to use between two SIP network components i.e. a low, medium or high encrypted link between the two points. The RFC uses word token to describe the syntax of sip header fields, but does not describe creating a secure path through one or more proxies.

SUMMARY OF THE INVENTION

The present invention is a method of setting up a SIP communication session between at least two client SIP nodes over at least one proxy SIP node. A proxy SIP node is located based on a destination client name and domain. A secure signal connection is set up between a calling client SIP node and the proxy SIP node. From the proxy SIP node, the destination client IP address is located using the destination client name and domain. An additional secure signal connection is set up from the proxy SIP node to a called client SIP node whereby the secure signal connection and the additional secure signal connection form a secure signal path. The destination client SIP node is requested to return its IP address across the secure signal path. The returned IP address is used to set up a data connection between the calling client SIP node and the destination client SIP node.

BRIEF DESCRIPTION OF THE DRAWINGS

Embodiments of the invention will now be described, by means of example only, with reference to the accompanying drawings in which.

DETAILED DESCRIPTION

FIG. 1 is a schematic of SIP clients 10A and 10B, proxies 12A-12C, domain networks 16A and 16B and external network 18. Although only one proxy is labelled in each network, any one of a number of proxies exist in the networks and may be used to form a secure network. SIP clients 10A, 10B and their respective proxies 12A, 12B and domain directory servers 14A, 14B are located in respective domains 16A and 16B e.g., company intranets. Domains 16A and 16B are connected together over a wide area network 18 (e.g. the internet). In the context of the invention, client 10A is initially only aware of client 10B's name and domain (e.g. client 10B@domain 16B) and not aware of client 10B's IP address (e.g. 123.546.789.000) and therefore needs to locate 10B before setting up a call. During the location process a connection will be typically set up between: client 10A; a proxy 12A in domain 16A; a proxy 12C in network 18; a proxy 12B in domain 16B; and finally, client 10B. Once the IP address is acquired from the location process, a non-proxy connection 19 can be set up to send the data. Domain directory server 14B is used by proxy 12B to locate the destination client 10B's IP address. Domain directory server 14A does the same for domain 16A. This configuration of proxies and clients is an example only and the invention may be realized whenever multiple secure connections are needed, for example, with two clients and a single proxy or between multiple clients in a conference call.

Figure 2:
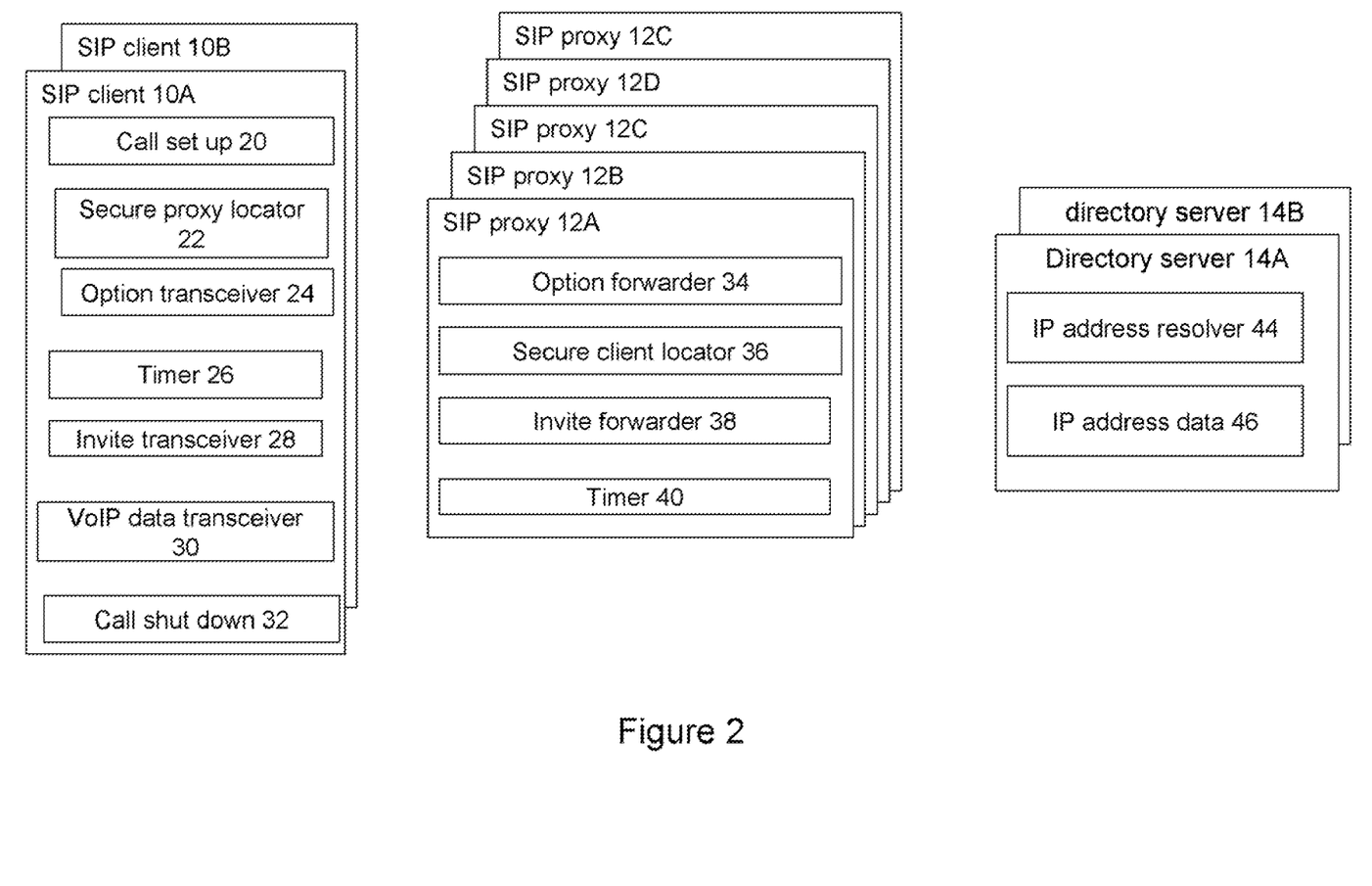
FIG. 2 is a schematic of a client, proxy server and directory server of the present embodiment.

FIG. 2 is a schematic diagram of client 10A, proxy server 12A and domain directory server 14A of the present embodiment. Client 10A comprises: a call set up component 20; a secure proxy locator 22; an option transceiver 24; a timer 26; an invite transceiver 28; a VoIP data transceiver 30; and a call shut down component 32.

The call set up component 20 controls the setting up of a call with another client. The secure proxy locator 22 manages the communication with the proxies. It filters known proxies for those with a secure connection by querying the proxy directly or from memory.

Figure 4:
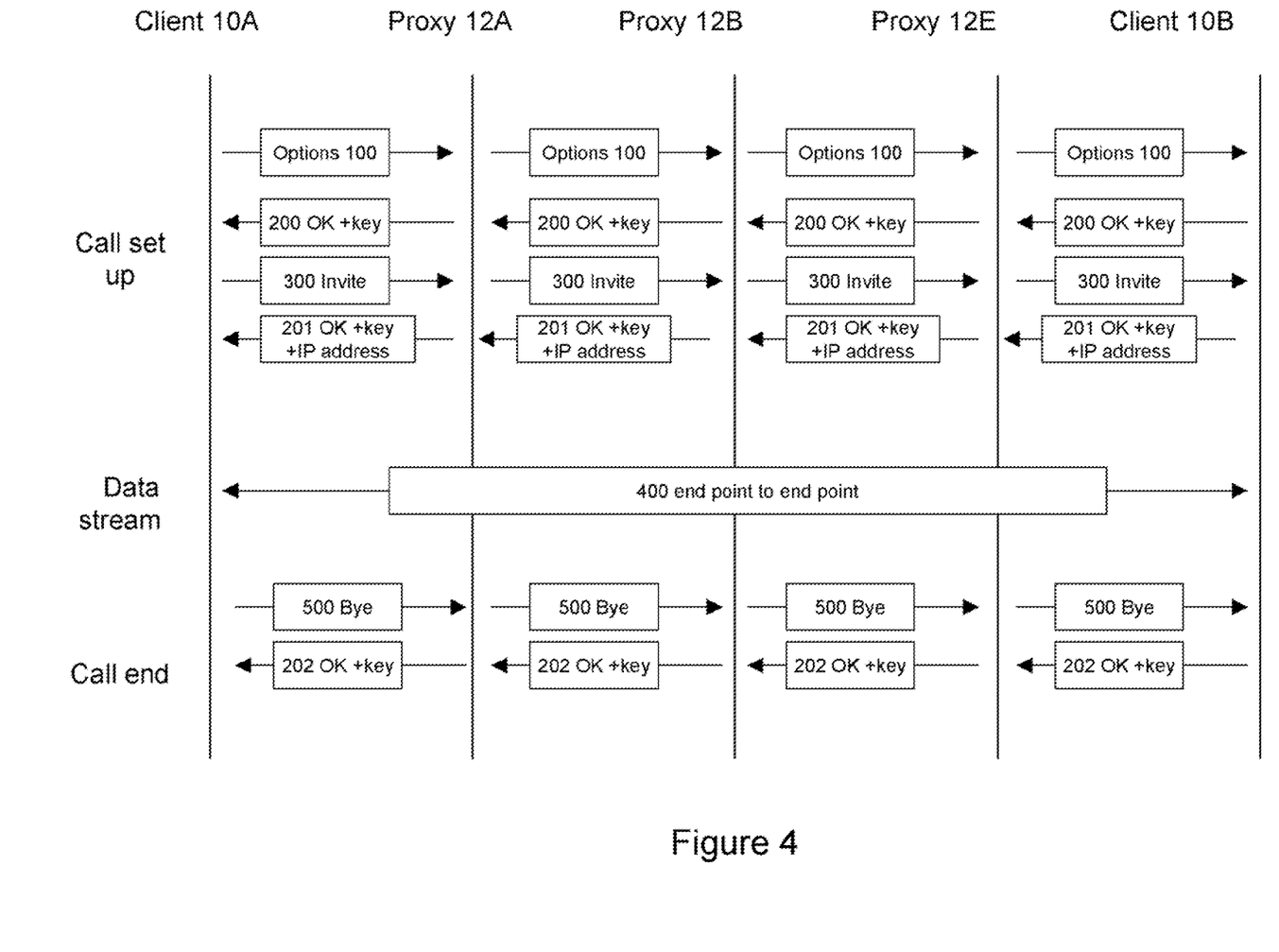
FIG. 4 is an event diagram according to the present embodiment.

The option transceiver 24 sends and receives an option 100 signal (see FIG. 4). An option signal is one of the first signals used in setting up a call and comprises a request for a proxy with a particular option—in the case of the present embodiment—a verified encryption secure path (VESP) option. If an option request is received with a VESP option and the SIP client is VESP compatible then the option transceiver 24 allows the request of the call set up to proceed and will respond with a 200 OK signal indicating VESP support (see FIG. 4). Otherwise the SIP client will not acknowledge the option request with a 200 OK signal. When the option transceiver receives the 200 OK signal, control passes to the invite transceiver 28.

Timer 26 starts timing from when an option 100 message is sent out and continues until a 200 OK signal is received back. The call set up process can timeout if the response time exceeds a threshold. When a timeout occurs, option transceiver 24 will select another secure SIP proxy and send another option 100 signal. If there are no more secure proxies then the secure call set up will cancel. The time is also used to time responses in the invite transceiver 28.

Invite transceiver 28 sends an invite message and a session key to the VESP compliant proxy and waits for a 201 OK and an IP address. Timer 26 also times the wait and times out when a threshold has been reached. Again another secure proxy is chosen or the secure set up is cancelled if the process times out. VoIP data transceiver 30 controls the sending of the VoIP data across the network directly between the clients once the IP address is discovered. Call shut down component 32 controls the shutting down of the call when the call ends.

Each proxy 12 comprises: an option forwarder 34; a secure client locator 36; an invite forwarder 38; and a timer 40.

The option forwarder 34 receives and forwards option 100 signals (see FIG. 4). When an option request is received with a VESP option, the option forwarder 34 notes that the VESP option requires secure call set up and notifies the secure client locator 36 to locate a secure client or proxy. The option forwarder 34 receives a 200 OK signal in response and forwards this back to the sender of the option 100 signal.

The secure client locator 36 queries a directory server for an IP address of a client. If the client is located then a client IP address is returned to the proxy. If not then the IP address of another proxy is returned for further querying and further secure call set up.

Once the secure proxy path has been set up then an invite signal is sent by the originating SIP client and received by the invite forwarder 38. The invite forwarder forwards the invite signal along the secure path and returns an OK signal back along the path.

Timer 40 times the response waiting of option forwarder 34 and the invite forwarder 38 so that neither waits for a period exceeding a threshold.

Each directory server 14 includes an IP address resolver 44 and IP address data 46.

The IP address resolver 44 receives a request containing a client name and domain from a client 10 or proxy 12 and attempts to match the name and domain with an IP address. If a match is found, the IP address data 46 is sent back to the requester.

Figure 3A:
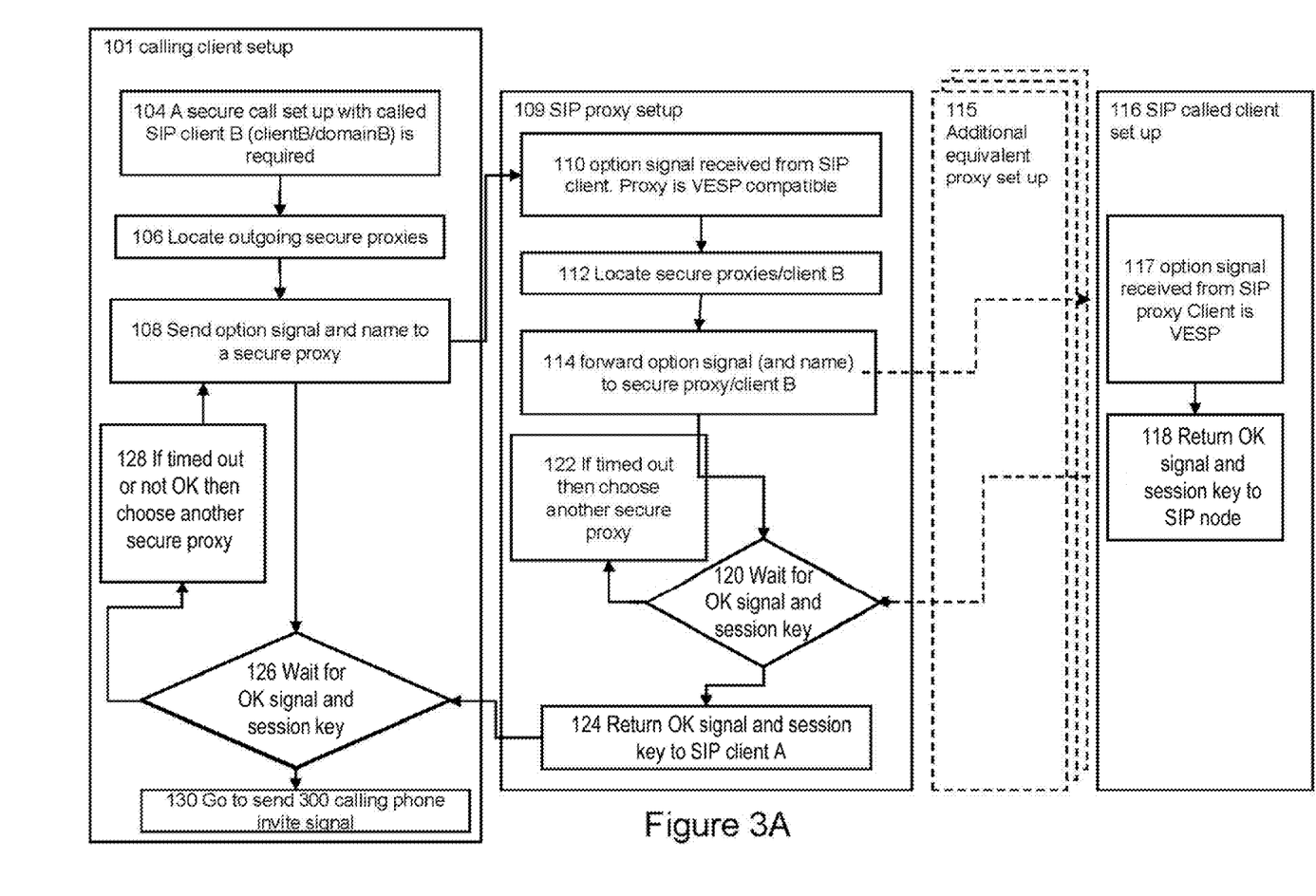
FIG. 3A is a schematic of an IP location part of a SIP call setup according to the present embodiment.

FIG. 3A is a schematic of the first part of a SIP call setup according to the present embodiment. Method 101 defines the calling client setup process. In step 104 a secure call setup is defined in the calling client set up component 20 using the called client name (e.g. client 10B) and called client domain (e.g. domain 16B). In step 106, the secure proxy locator 22 locates an outgoing proxy by querying a list of known proxies. The names of proxies that are not VESP compatible are necessarily known and each proxy must be tested for its ability to set up a secure connection. In step 108, the option transceiver 24 sends an option 100 signal to one of the secure proxies. The option 100 signal comprises an option for a VESP compatible proxy.

Method 109 defines the SIP proxy setup process and comprises: steps 110, 112, 114, 120, 122, and 124. In step 110, the option 100 signal is received from SIP client by the option forwarder 34. If the proxy is VESP compatible then the option signal is accepted and control is passed to the next step. In step 112, the secure client locator 36 attempts to locate client B by querying a directory server. If the client 10B is not located then another secure proxy is located which is nearer to the domain of the client and potentially will know the IP address of the client. A domain proxy will typically have IP addresses of clients in that domain.

In step 114, the option signal (and name) is forwarded to the secure client B if the directory server is aware of the client IP address (Method 116 SIP called client set up). If the associated directory server is not aware of the client B IP address then the option signal is forwarded to another proxy having a potential of locating the IP address of the client (method 115 additional equivalent proxy setup).

Process 115 represents one or more additional equivalent proxy set up equivalent to the initial 109 SIP proxy setup with equivalent steps 110, 112, 114, 122, 120, and 124. This process occurs zero to n times depending on the number of proxy servers needed to locate the called client.

Method 116 is the called client set up process comprising steps 117 and 118. In step 117, the option signal 100 is received from SIP proxy. If the client is VESP compatible then it is accepted and the process moves on. In step 118, a return ok 200 signal including a session key is sent to the SIP node via the connecting proxy.

Method 115 forwards the ok 200 signal if there is more than one return proxy in the connection.

Step 120 in proxy setup 109 (or equivalent 115 proxy setup) waits for the 200 OK signal and moves to step 124. If the waiting times out then the process moves to step 122. Step 122 chooses another secure proxy from the associated directory server and again forwards an option signal at step 114.

Step 124 returns the OK signal to SIP client 10 in method 109. In equivalent proxy set up method 115 the equivalent step 124 returns the OK signal to the connecting proxy.

Step 126 in the calling client setup method 101 waits for 200 OK signal and moves to step 130. A secure connection path is now complete and marked by the returned session key. If step 126 times out then the process moves to step 128. Step 128 chooses another secure proxy from the associated directory and again forwards the option signal at step 108. In Step 130 process control moves to method 300.

Figure 3B:
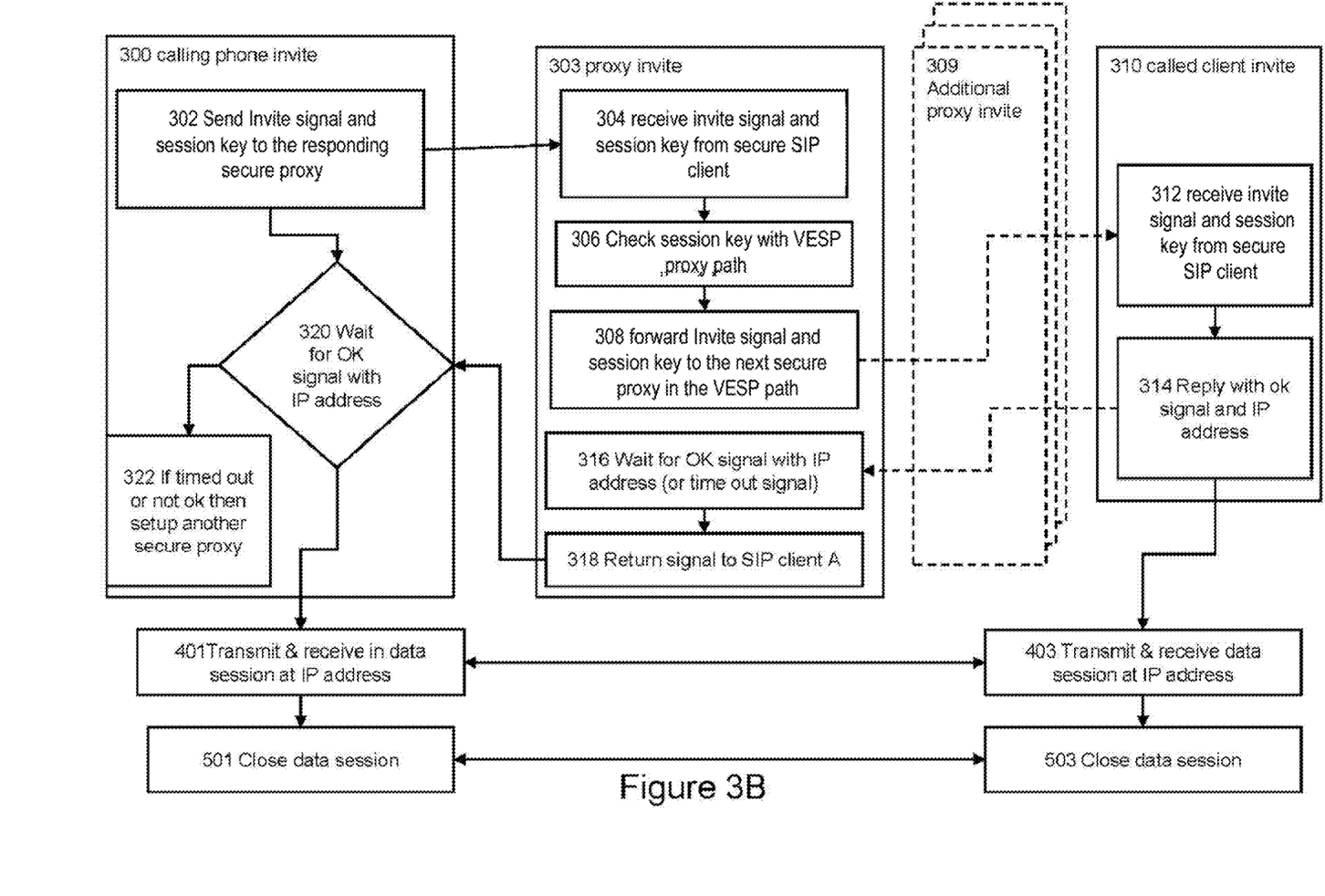
FIG. 3B is a schematic of an invitation part of a SIP call setup according to the present embodiment.

FIG. 3B is a schematic of a second part of a SIP call setup according to the present embodiment Method 300 is a calling phone invite process comprising steps 302, 320, 322 performed in the invite transceiver 28. Step 302 sends an invite signal including the session key to the first secure proxy in the secure connection path.

Method 303 is a proxy invite process comprising steps 304, 306, 308, 316 and 318 performed in invite forwarder 38 in the first and subsequent proxies in the secure connection path. Step 304 receives the invite signal including the session key from secure client. Step 306 checks the session key with the assigned secure connection path. The next proxy or client in the connection path is located. In step 308 forwards the invite signal including the session key to next secure proxy in the secure connection path.

Process 309 represents one or more additional equivalent proxy invite equivalent to the initial 303 proxy invite with equivalent steps 304, 306, 308, 316 and 318. This process occurs zero to n times depending on the number of proxy servers needed.

Process 310 is a called client invite method performed by a client invite transceiver 28 and comprising steps 312 and 314. Invite including the session key is received from one or more proxy depending on the number needed to locate the client. In step 312 the invite transceiver receives the invite signal including the session key from secure SIP client. If the session is okay to accept then the process moves on. In step 314 the invite transceiver replies with an OK signal 201 including the IP address of the called client and the session key.

Step 316 waits for the OK signal 201 in proxy invite method 303. In equivalent proxy invite method 309 the equivalent step 316 waits for 124 the OK signal 201. If the waiting times out then the connection fails. Step 318 returns the OK signal 201, IP address and session key to the calling SIP client.

Step 320 in the calling client invite method waits for OK signal 201, IP address and session key. If the waiting times out then the process moves to step 322. If the wait is successful then the process moves on to transmit VoIP data at 401. Step 322 resets the call setup to another proxy server.

Steps 401 and 403 are performed by respective VoIP transceivers in the calling client 10A and the called client 10B. Step 401 in the calling client VoIP data transceiver transmits to and receives from the called client directly through the network without any proxies. A VoIP data session is created. The VoIP data may be encrypted for extra security. Step 403 in the called client VoIP data transceiver receives from and transmits to the calling client using the created data session.

Steps 501 and 503 are performed by the respective call shut down components 32 in the calling client and called client. Either client may initiate the close down although, in this example and embodiment, the calling client initiates the close down. In step 501 a close session signal is sent along the secure path to the called client. Once a 202 OK signal is received than both the data session and the secure path session are cancelled in the calling client. In step 503, the called client sends a 202 OK and session key to the calling client and closes the data session and the secure session.

FIG. 4 is an event diagram according to the present embodiment and example. During the call setup an options 100 signal is sent from the calling client 10A through the proxies to the called client 10B. A 200 OK+session key is returned from the called client to the calling client. A 300 invite+session key is sent from the calling client to the called client. A 201 OK+session key+IP address is sent from the called client to the calling client. A data stream 400 is created between the clients using the returned IP address. At call end a 500 BYE signal is sent from one client through the proxies to the other client. A 202 OK signal is sent back and the secure sessions and data sessions are ended.

It will be clear to one skilled in the art that the method of the present invention may suitably be embodied in other logic apparatus other than the example of FIG. 1, and that such logic means may comprise hardware components or firmware components.

It will be equally clear to one skilled in the art that the logic arrangement of the present invention may suitably be embodied in a logic apparatus comprising logic means to perform the steps of a method other than the example of FIGS. 3A and 3B, and that such logic means may comprise components such as logic gates in, for example, a programmable logic array. Such a logic arrangement may further be embodied in enabling means for temporarily or permanently establishing logical structures in such an array using, for example, a virtual hardware descriptor language, which may be stored using fixed or transmittable carrier media.

It will be appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions fixed on a tangible medium, such as a computer readable medium, for example, diskette, CD-ROM, ROM, or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

It will also be appreciated that various further modifications to the preferred embodiment described above will be apparent to a person of ordinary skill in the art.

What is claimed is:

1. A method comprising:

detecting, by a first proxy, that a secure path between a first session initiation protocol client and a second session initiation protocol client should be created, wherein the secure path allows secure transmission of session setup messages;

determining that the first proxy can support a secure path;

forwarding a message sent from the first session initiation protocol client to a second proxy, wherein the message indicates a request for the secure path;

receiving a session key from the second session initiation protocol client via the second proxy, wherein the session key indicates a portion of the secure path that comprises the second proxy;

storing data that associates the session key with the second proxy and that indicates the second proxy as a next hop in the secure path to the second session initiation protocol client;

forwarding the session key to the first session initiation protocol client to allow the first session initiation protocol client to send an invite message and the session key to the second session initiation protocol client over the secure path that comprises the first proxy and the second proxy;

receiving the invite and the session key, from the first session initiation protocol client;

using the session key and the stored data to determine the second proxy to be the next hop in the secure path;

forwarding the invite and the session key to the second proxy;

receiving an OK response to the invite and a network address of the second session initiation protocol client from the second session initiation protocol client via the second proxy; and forwarding the network address to the first client for the first client to create a secure data connection with the second session initiation protocol client based on the network address.

2. The method of claim 1 further comprising:

determining that a plurality of proxies can be a next hop to the second session initiation protocol client and that the plurality of proxies can support the secure path; and selecting the second proxy from the plurality of proxies to forward the message.

3. A computer program product for initiating data connections via secure data connection setup paths, the computer program product comprising:

a computer usable medium having computer usable program code embodied therewith, the computer usable program code comprising:

computer usable program code configured to, detect that a secure path between a first session initiation protocol client and a second session initiation protocol client should be created, wherein the secure path allows secure transmission of session setup messages;

determine that a first proxy can support a secure path;

forward a message sent from the first session initiation protocol client to a second proxy, wherein the message indicates a request for the secure path;

receive a session key from the second session initiation protocol client via the second proxy, wherein the session key indicates a portion of the secure connection path that comprises the second proxy;

store data that associates the session key with the second proxy and that indicates the second proxy as a next hop in the secure path to the second session initiation protocol client;

forward the session key to the first session initiation protocol client to allow the first session initiation protocol client to send an invite message and the session key to the second session initiation protocol client over the secure path that comprises the first proxy and the second proxy;

receive the invite and the session key, from the first session initiation protocol client;

use the session key and the stored data to determine the second proxy to be the next hop in the secure path;

forward the invite and the session key to the second proxy receive an OK response to the invite and a network address of the second session initiation protocol client, from the second session initiation protocol client via the second proxy; and forward the network address to the first session initiation protocol client for the first session initiation protocol client to create a secure data connection with the second session initiation protocol client based on the network address.

4. The computer program product of claim 3 comprises the computer usable program code being further configured to:

determine that a plurality of proxies can be the next hop to the second session initiation protocol client and that the plurality of proxies can support the secure path; and select the second proxy from the plurality of proxies to forward the message.

5. A proxy comprising:

a processing unit;

a network interface;

an option forwarder coupled with the network interface, the option forwarder being operable to, detect that a secure connection path between a first session initiation protocol client and a second session initiation protocol client should be created, wherein the secure connection path allows secure transmission of session setup messages;

determine that the proxy can support a secure connection path; and a secure client locator coupled with the option forwarder, the secure client locator operable to, forward a message sent from the first session initiation protocol client to a secure proxy, wherein the message indicates a request for the secure connection path;

receive a session key from the second session initiation protocol client via the secure proxy, wherein the session key indicates a portion of the secure connection path that comprises the secure proxy;

store data that associates the session key with the secure proxy and that indicates the secure proxy as a next hop in the secure connection path to the second session initiation protocol client;

forward the session key to the first session initiation protocol client to allow the first session initiation protocol client to send an invite message and the session key to the second session initiation protocol client over the secure connection path that comprises the proxy and the secure proxy; and an invite forwarder coupled with the secure client locator, the invite forwarder operable to, receive the invite and the session key, from the first session initiation protocol client;

use the session key and the stored data to determine the secure proxy to be the next hop in the secure connection path;

forward the invite and the session key to the secure proxy;

receive an OK response to the invite and a network address of the second session initiation protocol client, from the second session initiation protocol client via the secure proxy;

forward the network address to the first client to cause the first client to create the secure data connection with the second session initiation protocol client based on the network address.

6. The proxy of claim 5, wherein the secure client locator is further operable to:

determine that a plurality of proxies can be the next hop to the second session initiation protocol client and that the plurality of proxies can support the secure path; and select the second proxy from the plurality of proxies to forward the message.

7. A network comprising:

a first session initiation protocol client that detects an indication to create a secure data connection with a second session initiation protocol client;

determines that the secure data connection should be created on a secure path, wherein the secure path allows secure transmission of session setup messages;

queries a first proxy, and accesses information stored about the first proxy in a memory of the first session initiation protocol client to determine that the first proxy can support the secure path;

transmits a message to the first proxy, wherein the message indicates a secure data connection setup path option;

receives a session key from the first proxy, wherein the session key indicates the secure path that comprises the first proxy and a second proxy; and stores data that associates the session key with the first proxy and that indicates the first proxy as a next hop in the secure path to the second session initiation protocol client with respect to the first session initiation protocol client, sends an invite message and the session key to the first proxy for delivery to the second session initiation protocol client;

the first proxy that, receives the message from the first session initiation protocol client, determines that the first proxy can support the secure path, determines that the second proxy can support the secure path, forwards the message sent from the first session initiation protocol client to the second proxy, receives the session key from the second proxy, wherein the session key indicates a first portion of the secure path that comprises the second proxy, stores data that associates the session key with the second proxy and that indicates the second proxy as a next hop in the secure path to the second session initiation protocol client with respect to the first proxy, forwards the session key to the first session initiation protocol client;

the second proxy that, receives the message from the first proxy;

determines that the second proxy supports the secure path between the first session initiation protocol client and the second session initiation protocol client, forwards the message sent from the first proxy to the second session initiation protocol client, receives the session key from the second session initiation protocol client, stores data that associates the session key with the second session initiation protocol client, forwards the session key to the first proxy; and the second session initiation protocol client that, receives the message from the second proxy, generates the session key;

transmits the session key to the second proxy.

8. The network of claim 7 wherein the first session initiation protocol client also, determines, based on the session key, the invite should be sent to the first proxy for delivery to the second session initiation protocol client; and sends the invite and the session key to the first proxy.

9. A network of comprising:

a first session initiation protocol client that, detects an indication to create a secure data connection with a second session initiation protocol client;

determines that the secure data connection should be created on a secure path, wherein the secure path allows secure transmission of session setup messages;

determines that a first proxy can support the secure path;

transmits a message to the first proxy, wherein the message indicates a request for the secure connection path;

receives a session key from the first proxy, wherein the session key indicates the secure path that comprises the first proxy and a second proxy; and stores data that associates the session key with the first proxy and that indicates the first proxy as a next hop in the secure path to the second session initiation protocol client with respect to the first session initiation protocol client, sends an invite message and the session key to the first proxy for delivery to the second session initiation protocol client;

the first proxy that, receives the message from the first session initiation protocol client, determines that the first proxy can support the secure path, determines that the second proxy can support the secure path, forwards the message sent from the first session initiation protocol client to the second proxy, receives the session key from the second proxy, wherein the session key indicates a first portion of the secure path that comprises the second proxy, stores data that associates the session key with the second proxy and that indicates the second proxy as a next hop in the secure path to the second session initiation protocol client with respect to the first proxy, forwards the session key to the first session initiation protocol client;

the second proxy that, receives the message from the first proxy;

determines that the second proxy supports the secure path between the first session initiation protocol client and the second session initiation protocol client, forwards the message sent from the first proxy to the second session initiation protocol client, receives the session key from the second session initiation protocol client, stores data that associates the session key with the second session initiation protocol client, forwards the session key to the first proxy; and the second session initiation protocol client that, receives the message from the second proxy, generates the session key;

transmits the session key to the second proxy, wherein the first proxy and the second proxy that determines the second proxy supports the secure path comprises, the first proxy forwarding the message from the first session initiation protocol client to the second proxy, wherein the message comprises a secure path option; and the second proxy determining if the second proxy implements a protocol that supports the secure path and transmitting a confirmation message to the first proxy, wherein the confirmation message indicates that the second proxy supports the secure path.

* * * * *